United States Patent
Flask et al.

(10) Patent No.: US 11,153,650 B1
(45) Date of Patent: Oct. 19, 2021

(54) METHOD AND APPARATUS PROVIDING OPTIMIZED MPEG VALIDATION IN A CABLE TV NETWORK

(71) Applicant: VIAVI SOLUTIONS INC., San Jose, CA (US)

(72) Inventors: Robert Flask, New Palestine, IN (US); Loren R. Eggert, Indianapolis, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 17/067,280

(22) Filed: Oct. 9, 2020

(51) Int. Cl.
*H04N 21/462* (2011.01)
*H04N 21/438* (2011.01)
*H04N 21/61* (2011.01)
*H04N 21/442* (2011.01)
*H04N 21/84* (2011.01)

(52) U.S. Cl.
CPC ......... *H04N 21/462* (2013.01); *H04N 21/438* (2013.01); *H04N 21/44209* (2013.01); *H04N 21/6118* (2013.01); *H04N 21/84* (2013.01)

(58) Field of Classification Search
None
See application file for complete search history.

(56) References Cited

PUBLICATIONS

Sowinski et al., "Remote PHY 2.0", SCTE-ISBE Expo, Sep. 30-Oct. 3, 2019 (Year: 2019).*
Data-Over-Cable Service Interface Specification, DCA-MHAV2, Remote PHY Specification, Oct. 1, 2015 (Year: 2015).*

\* cited by examiner

*Primary Examiner* — James R Marandi
(74) *Attorney, Agent, or Firm* — DLA Piper LLP (US)

(57) ABSTRACT

A method and test instrument for validating MPEG content in a CATV network, particularly one having a Remote PHY architecture.

20 Claims, 15 Drawing Sheets

METHOD AND APPARATUS PROVIDING OPTIMIZED MPEG VALIDATION IN A CABLE TV NETWORK

BACKGROUND

The cable space is rapidly embracing the Remote PHY (also known as R-PHY, R PHY, and RPHY) network architecture. Remote PHY is popular among cable television (CATV) network service providers because it does an effective job of alleviating the rack space, power, and cooling constraints in the hub of the network. Remote PHY does this by separating out the PHY layer and redistributing it out to the fiber node. Remote PHY specifications exist and have become the standard for the industry.

Remote PHY is part of a larger family of technologies known as distributed access architectures (DAA), which alleviate congestion in the hub. In general, DAA technologies such as Remote PHY virtualize and move certain aspects of a network out of the hub and closer to subscribers. Hubs are evolving from housing row after row of specialized equipment and RF splitting/combining networks, into potentially little more than a small collection of optical switches and routers.

In addition to reducing space, power and cooling requirements in the hub, Remote PHY also eliminates the analog optical link and replaces it with a commodity digital 10G Ethernet link. This provides distinct advantages such as e.g., 1) a digital link is easier to set up, taking less time to deploy; 2) the link is more reliable, requiring less maintenance and manpower in the future; and 3) significant signal to noise ratio (SNR) gains may be achieved using digital optical links versus the old amplitude modulated links, potentially enabling higher modulation orders for DOCSIS (Data Over Cable Service Interface Specification) 3.1 downstreams. Technologies such as Remote PHY and DOCSIS 3.1 are extending the life of the hybrid fiber coax (HFC) plant by leveraging much of the existing infrastructure to deliver Gigabit speeds.

In the traditional network architecture, all of the RF is generated or received in a headend or hubsite. This provides a centralized place where tests can be performed. If the content of the signals is ensured in the headend/hubsite then the measurements out in the field really only need to validate the physical layer integrity to ensure that the appropriate content is reaching the end user. The Remote PHY network architecture changes this. In this environment, the RF signals are no longer generated in a centralized place, but rather the creation is distributed out closer to the network edge; typically at the node. This requires that the testing is also performed out at the node to ensure that the signals are correct.

FIG. 1 illustrates an example CATV network 10 having a Remote PHY architecture. Specifically, the network 10 includes a converged cable access platform (CCAP) device 12, switch/router 14, Remote PHY device (RPD) 16 and a set-top box 18. In the illustrated example, a user's television 20 is connected to the set-top box 18 to display video 30 that may include broadcast audio and video 32 (e.g., programs) and a user guide based on guide data 34. In the illustrated example, configuration data 22 is used to configure the CCAP device 12, switch/router 14, and RPD 16. Data 28, which may include Internet Protocol (IP) data 26 and or voice over IP (VoIP) data 28 may be received by the CCAP device 12.

In the illustrated example, the network 10 may utilize QAM (quadrature amplitude modulation) and MPEG (Moving Picture Experts Group) transport streams to deliver the data 24 and video 30 to the RPD 16 through one or more Ethernet connections E1-E5 and deliver the data 24 and video 30 to the set-top box 18 from the RPD 16 through e.g., a coaxial connection C1. It should be appreciated that the switch/router 14 may not be required, meaning that the CCAP device 12 could be connected directly to the RPD 16, if desired.

As can be seen, there are many components in the network 10 that need to be configured properly for the network 10 to work. Further complicating matters is that the guide data 34 and video content 32 come from separate sources and possibly take a separate path to the RPD 16. Moreover, there is a need and desire for the network to output correct information. Currently, the traditional consumers of MPEG data in a CATV network (e.g., modems, set-top boxes, some measurement equipment) need to collect the guide data 34 (also referred to as the "logical channel plan") first because these consumers are typically program driven. For example, when a user turns on its television, he/she may know that it wants to watch a certain program. The user may either type in the "channel" (e.g., 1304), or he/she may navigate to the program using the on screen programming guide. The user may hit "enter," causing the set-top box to tune to the required channel and start displaying the program. All of this requires that the guide data 34/logical channel plan be present up front on the user's device (e.g., set-top box 18). The guide data 34 is used to populate the on screen guide and to instruct the set-top box 18 how to physically tune into the program since the channel number (e.g., 1304) is just a logical construct and provides no useful information as to where the program can be found in the frequency domain. The guide data 34 is therefore used to determine which of the programs (and therefore the elementary streams that comprise the programs) that are present in the MPEG transport streams on this channel correspond to the desired program.

The conventional testing of this network 10 typically requires running a drop from the RPD 16 to a truck, which adds time to the testing. The testing also requires an expensive rack of legacy set-top boxes and a display, which adds cost to the testing. These two consequences are undesirable. Moreover, the conventional testing requires the technician to first capture the logical channel plan. This typically takes between 2.5 to 3 minutes to complete. Then, the technician needs to manually step through each channel and use an MPEG analyzer (or MPEG analyzer feature of a test instrument) to determine the content on each channel and manually compare that content to the logical channel plan. This could take 20 minutes or more, which is undesirable.

Accordingly, there is a need and desire for a better method to analyze and validate MPEG content in a CATV network, particularly one having a Remote PHY network architecture.

SUMMARY

Embodiments described herein may be configured to quickly and efficiently test and validate the content (e.g., MPEG content) in a CATV network having a Remote PHY architecture. In one or more embodiments, data collection and the processing of that data are performed in parallel. An analysis of MPEG content can be performed in a few minutes (e.g., approximately 3 minutes), which is almost ten times faster than conventional testing methods.

In one embodiment, a computer-implemented method is provided. The method is performed on a test instrument adapted to test Moving Picture Experts Group (MPEG)

content transmitted to a downstream portion of a cable television network having a Remote PHY architecture. The method comprises capturing the logical channel plan while, in parallel, capturing MPEG data on each physical channel and performing an analysis and accounting of the data to identify the programs, elementary streams and associated packet identifiers (PIDs) of said programs, and a count of the number of times PIDs were repeated within the analysis duration. Once complete, the logical channel plan can be validated against the discovered MPEG content and an evaluation is made to determine if each logical channel is present and properly formed or if one or more of a plurality of errors are discovered.

In another embodiment, a test instrument for testing for Moving Picture Experts Group (MPEG) content transmitted to a downstream portion of a cable television network having a Remote PHY architecture is provided. The test instrument comprises a storage device; and a processor executing program instructions stored in the storage device and being configured to capture contiguous MPEG data from an MPEG transport stream; capture a logical channel plan; and in parallel with capturing the contiguous MPEG data and logical channel plan: determine whether first content within the MPEG transport stream matches content within the logical channel plan; determine whether second content within the MPEG transport stream is associated with third content within the MPEG transport stream; and validate the MPEG content when it is determined that the first content matches the content within the logical channel plan and when it is determined that the second content is associated with the third content.

In one or more embodiments, the first content comprises a program number and determining that the first content matches the content within the logical channel plan comprises determining that the program number is contained within the logical channel plan. In one or more embodiment, the second content comprises a packet identifier associated with a program number found within a program association table (PAT) and determining that the second content is associated with the third content comprises determining that the MPEG transport stream comprises a packet with the packet identifier associated with the program number.

DETAILED DESCRIPTION OF SEVERAL EMBODIMENTS

Figure 1:
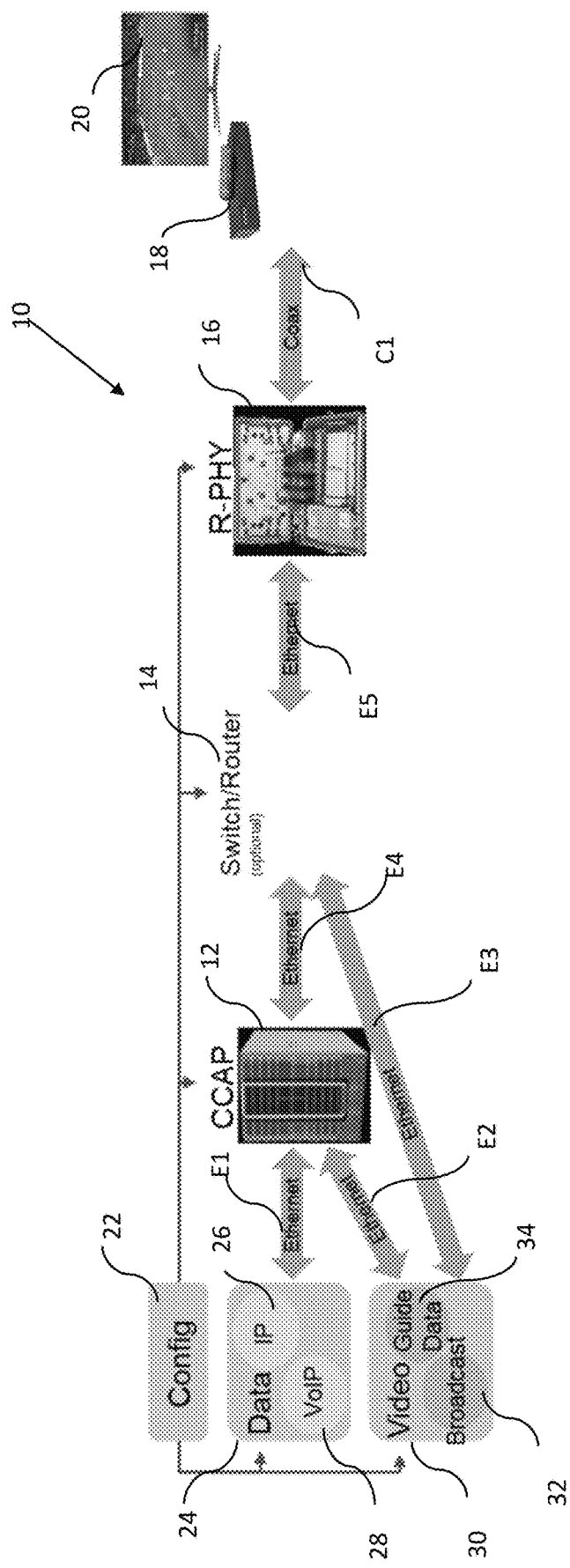
FIG. 1 shows an example CATV network having a Remote PHY architecture.
Figure 2:
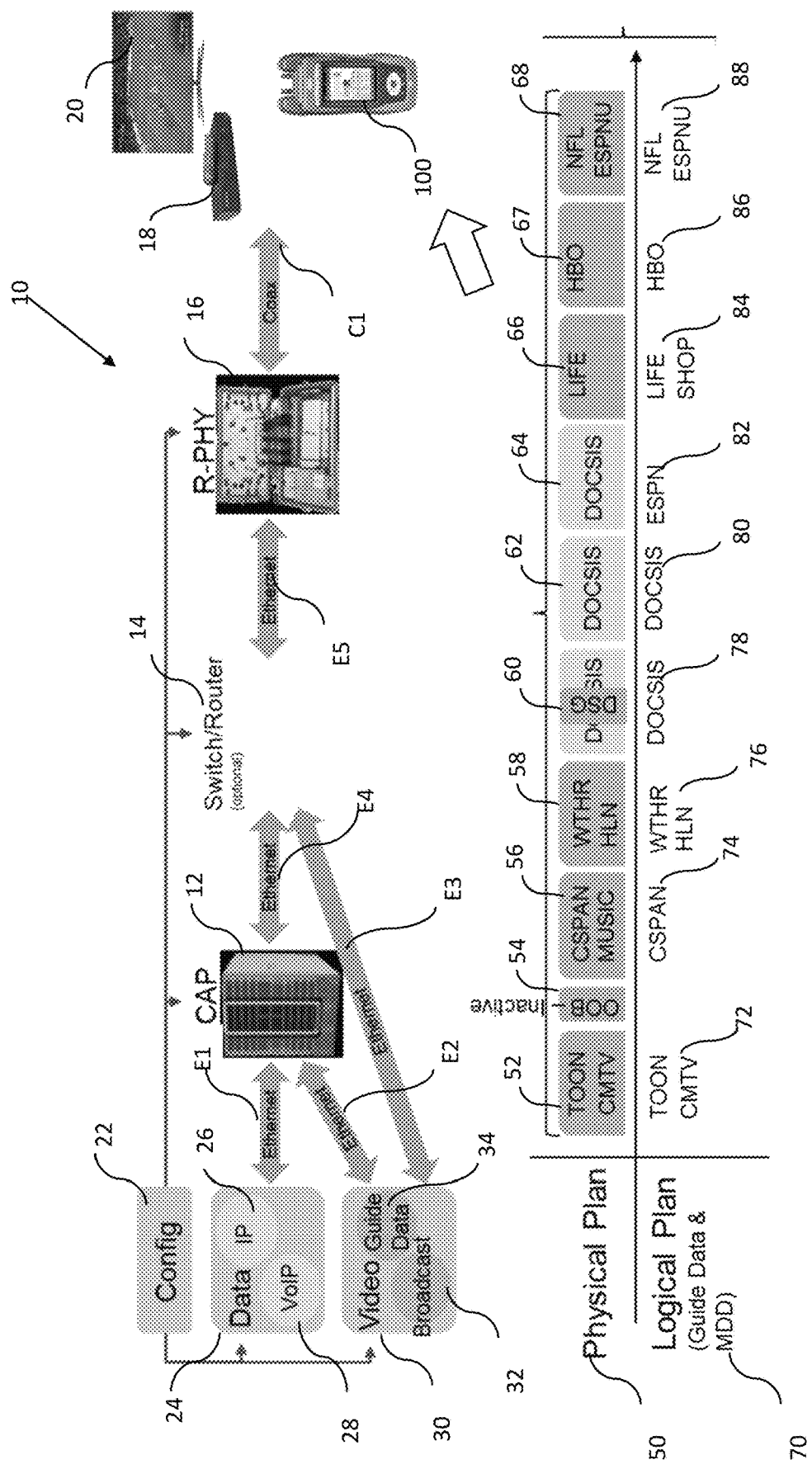
FIG. 2 shows the example CATV network of FIG. 1 being tested by a test instrument in accordance with the disclosed principles.

The disclosed principles provide a method and test instrument for validating MPEG content in a CATV network, particularly one having a Remote PHY architecture. For example, FIG. 2 shows the CATV network 10 of FIG. 1 being tested by a test instrument 100 in accordance with the disclosed principles. In the illustrated embodiment, the test instrument 100 is connected on the Remote PHY side of the network (e.g., at the RPD device 16, the user's premises, etc.) and will capture data, including a physical plan 50 and a logical channel plan (LCP) 70, and process the data in parallel. In the illustrated example, the LCP 70 includes guide data (e.g., guide data 34) and the MAC domain descriptor (MDD) of the DOCSIS channels. The LCP 70 may be received in any known manner, including from a DOCSIS tunnel or from an out of band (OOB) channel. In accordance with the disclosed principles, the test instrument 100 performs validation of the MPEG content in the MPEG transport stream in an efficient and extremely fast manner in comparison to the traditional method of testing said content.

In the illustrated example, the LCP 70 is collected by the test instrument 100. In parallel, the test instrument 100 may collect and evaluate each QAM to determine what programs are present, and evaluate the MDD from the DOCSIS channels to determine the frequencies used for high speed data. All of this processing is performed in parallel to substantially shorten the validation process.

As shown in FIG. 2, the physical plan 50 includes an MPEG stream with multiple channels 52-68, each corresponding to one of the broadcast video 32, guide data 34, IP data 26 or VoIP data 28. The y-axis in this portion of FIG. 2 represents frequency. In the illustrated example, certain channels 52, 56, 58, 66, 67 and 68 correspond to certain programs of the network 10 while one channel 54 corresponds to an out of band (00B) channel and one DOCSIS channel 60 that corresponds to a DOCSIS set-top gateway (DSG) tunnel that is contained within the DOCSIS channel. In the illustrated example, the LCP 70 similarly includes data 72, 74, 75, 82, 84, 86 and 88 corresponding to certain channels/programs of the network 10. The LCP 70 also includes DOCSIS data 78, 80.

In one or more embodiments, the test instrument 100 may analyze the channel and other data to ensure that they are all correct and consistent with respect to each other as discussed below with reference to the method 300 of FIG. 5 and the various examples illustrated in FIGS. 6-14.

Figure 3:
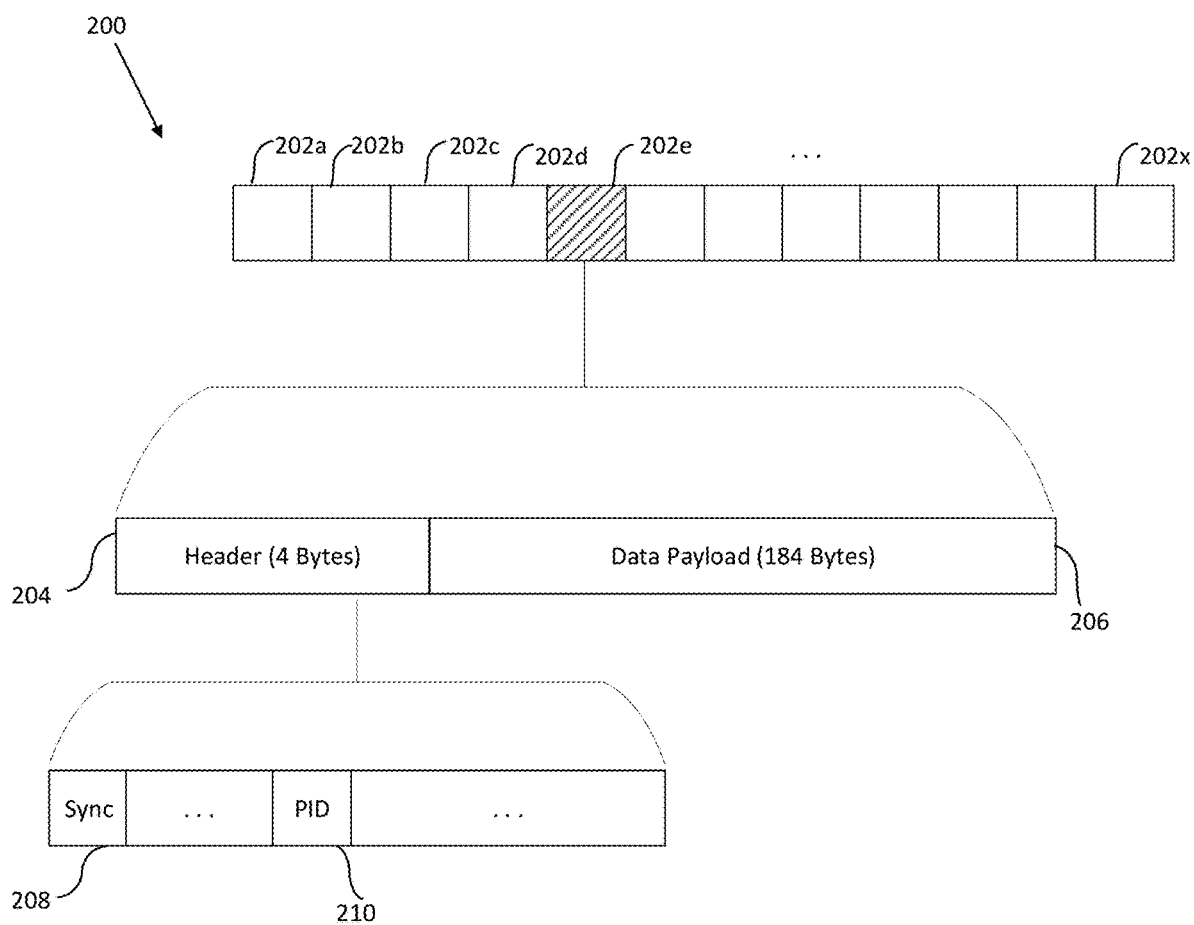
FIG. 3 shows an example format of an MPEG transport stream as is known in the art.

FIG. 3 shows an MPEG transport stream (i.e., QAM data) 200 comprising a plurality of transport packets 202a, . . . , 202x as is known in the art. As can be seen in FIG. 3, each packet 202a, . . . , 202x has a fixed length packet size (188 bytes) that includes a 4-byte header portion 204 and a 184-byte data payload 206. The header portion 204 includes, among other information, flags and data, a synchronization portion 208 and a packet identifier (PID) 210. The synchronization portion 208 allows a receiver (e.g., test instrument 100, set-top box 18) to determine the exact start time of the packet. The PID 210 identifies the packet with a number. In addition, as discussed below, the PID 210 identifies the packetized elementary streams (PES) of a program channel. A program (such as a television show) is usually composed of multiple PES channels (e.g. video and audio).

Figure 4:
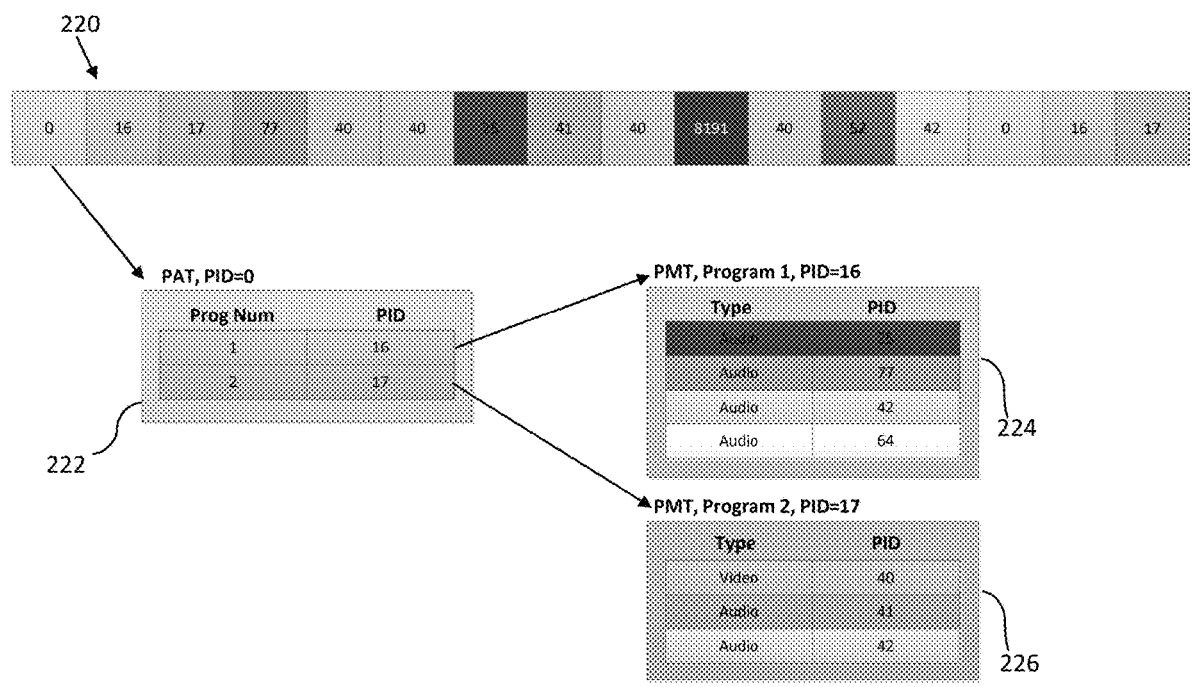
FIG. 4 shows a program association table (PAT) and program map tables (PMTs) as is known in the art.

It is known in the art that two tables contained within the MPEG transport stream are instrumental to understanding and interpreting the content of the programs contained within the stream. The first table is known as the program association table (PAT) and the second is a program map table (PMT). FIG. 4 shows a program association table (PAT) 222 and two program map tables (PMTs) 224, 226, presumably found within the example transport stream 220. As is known in the art, PAT 222 is delivered by a packet with a PID of 0 and contains a listing or mapping of programs to the PIDs of respective PMTs. In the illustrated example, the PAT 222 maps program 1 to 6 and program 2 to PID 17. As shown in the example, PID 16 identifies the packet containing PMT 224 for program 1 and PID 17 identifies the packet containing PMT 226 for program 2. Each PMT 224, 226 lists the elements/elementary streams that comprise the program by their associated packet PIDs. For example, PMT 224 lists four audio elements identified by PIDs 25, 77, 42, 64, respectively, and PMT 226 lists one video element identified by PID 40 and two audio elements identified by PIDs 41, 42.

Logical channel plans (e.g., LCP 70 of FIG. 2) are synonymous with programs and typically list one or more programs by name, program number, physical channel frequency and logical channel number. An example of a logical channel plan is shown below in Table 1.

TABLE 1

| Name | Program No. | Physical Frequency | Logical Channel Number |
| --- | --- | --- | --- |
| STARZ | 1 | 327000000 | 370 |
| EPIX | 2 | 327000000 | 373 |

Figure 5:
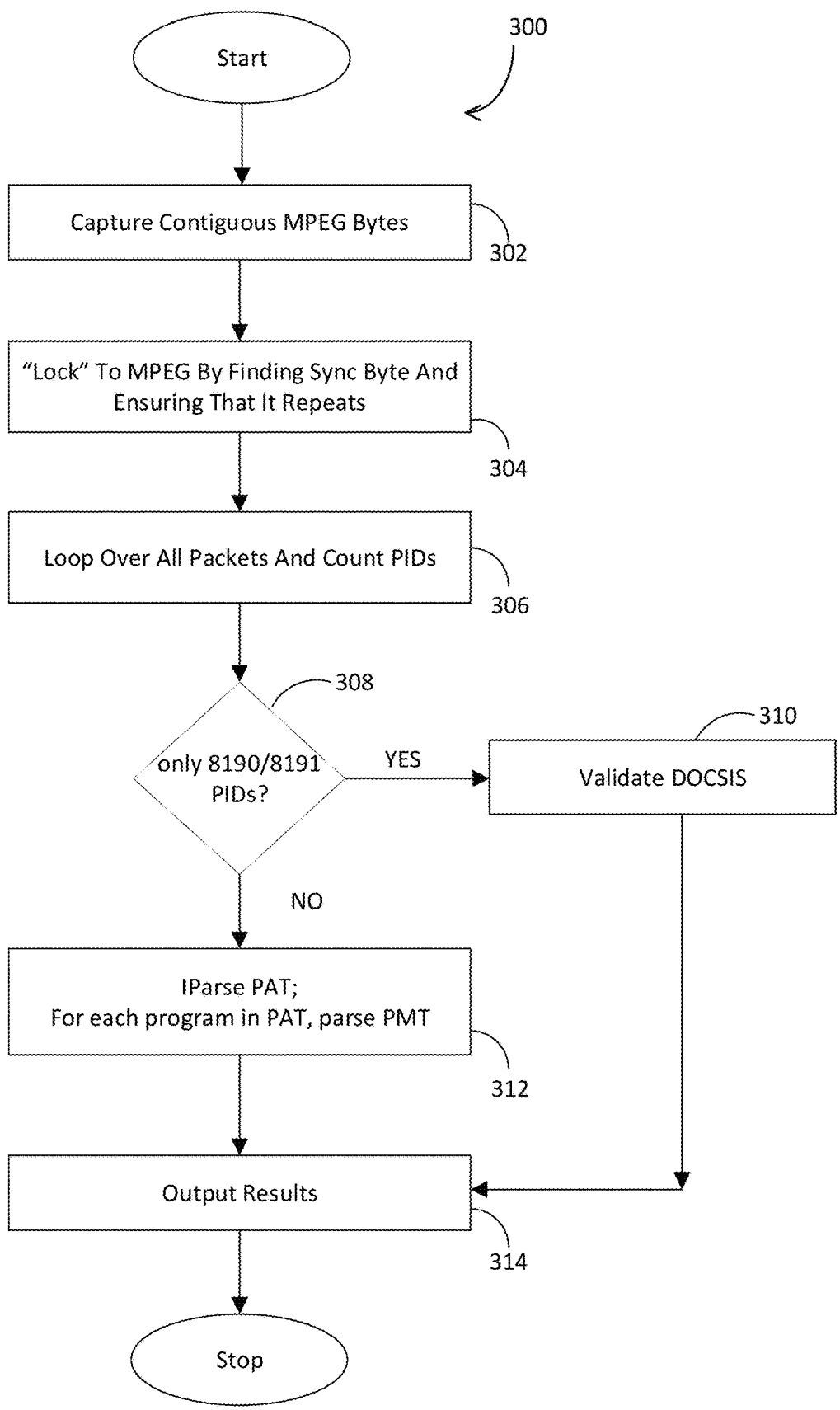
FIG. 5 shows an example method of validating MPEG content in accordance with the disclosed principles.

FIG. 5 shows an example method 300 of validating MPEG content in accordance with the disclosed principles. In one or more embodiments, the method is performed by the test instrument 100. In one embodiment, the test instrument 100 is one of the OneExpert CATV line of analysis meters manufactured and sold by VIAVI Solutions Inc. that is modified to perform the method 300 and other processing disclosed herein. In one or more embodiments, the modifications can be made to the OneExpert analysis meter by a software/firmware upgrade. In one embodiment, the method 300 may be activated by a technician and performed as part of an "MPEG Content Check" feature or other feature (e.g., "OneCheck") performed by the test instrument 100. The method 300 may be activated using one or more buttons or a touchscreen included with the instrument 100 (described below in more detail with respect to FIG. 15). Regardless of how it is activated, the method 300 should be executed after the test instrument 100 is connected to a tap on the Remote PHY side of the network 10.

At step 302, the test instrument 100 captures contiguous MPEG bytes (i.e., one or more contiguous MPEG packets) transported downstream (e.g., to a customer's premises). The test instrument 100 also captures the logical channel plan as discussed above. At step 304, the test instrument may "lock" on to an MPEG transport stream by finding the synchronization portion 208 within the header portion 204 of a packet and ensuring that the packets repeat consistently. If the test instrument cannot lock on to the MPEG tranport streams, the method 300 may output an alert (e.g., audible, visual, haptic, etc.) so that the technician knows that there is an error. At this point, the method 300 may terminate. If the test instrument 100 can lock onto the MPEG transport stream, the method 300 continues at step 306 where the test instrument 100 loops through all of the packets and detects and counts the PIDs within the stream.

At this point, the test instrument 100 is capable of analyzing the MPEG content. Specifically, at step 308 the test instrument 100 may determine if the detected PIDs consist solely of PID 8190 or PID 8191. As is known in the art, PID 8191 identifies a NULL packet and PID 8190 is reserved for a DOCSIS packet, meaning that the QAM is carrying DOCSIS data only. If the test instrument 100 determines that the PIDs consist solely of PID 8190 or PID 8191 (a "Yes" at step 308), then the method 300 continues at step 310, where the test instrument 100 provides an indication that the DOCSIS channels have been validated. It should be appreciated that this type of validation of DOCSIS channels does not currently exist and is one improvement that the disclosed principles provide. In one or more embodiments, the indication can be one or more of an audible, a visual and/or haptic (e.g., vibration) indication provided by the test instrument 100.

If, however, the test instrument 100 determines that the detected PIDs are not limited to PIDs 8190 and 8191 (a "No" at step 308), then the method 300 continues at step 312, where the test instrument 100 parses the out the PAT (e.g., PAT 222) from the transport stream; and for each program within the parsed PAT, the test instrument 100 parses out one or more PMTs (e.g., PMT 224, PMT 226). At step 314, the parsed information may be compared in several ways to determine, among other things, if the programs in the physical channel within the physical plan 50 match the LCP 70 (i.e., a comparison of MPEG content to the LCP), if the PIDs identified in either the PAT or PMTs are within the QAMs (i.e., a comparison of the MPEG content to other MPEG content), and or if there are any other inconsistencies worth bringing to the attention of the technician.

Also, at step 314, the appropriate indication is provided on the test instrument 100, which can include a listing of what was parsed (e.g., PIDs, PATs, PMTs, programs, etc.), what was validated (i.e., matches or indications of good MPEG content) and or what was not validated (i.e., errors, inconsistencies, etc.). In one or more ebodiments, a video verification summary may be provided (i.e., output on a display of the test instrument 100), which may include one or more of: the number of QAM carriers detected; the number of active QAM carriers; the DSG table name; the number of carriers in the DSG; the status of the DSG to physical QAM comparison (i.e., Pass/Fail); the number of QAM's missing from the logical plan; the number of QAM's not active, but in the logical Plan; the status of PID activity detection if enabled (i.e., pass/fail); and or the number of active PIDS and number of inactive PIDS. As with other indications provided by the test instrument 100, there is no limit or restrictions on the type of indication used at step 314.

Figure 6:
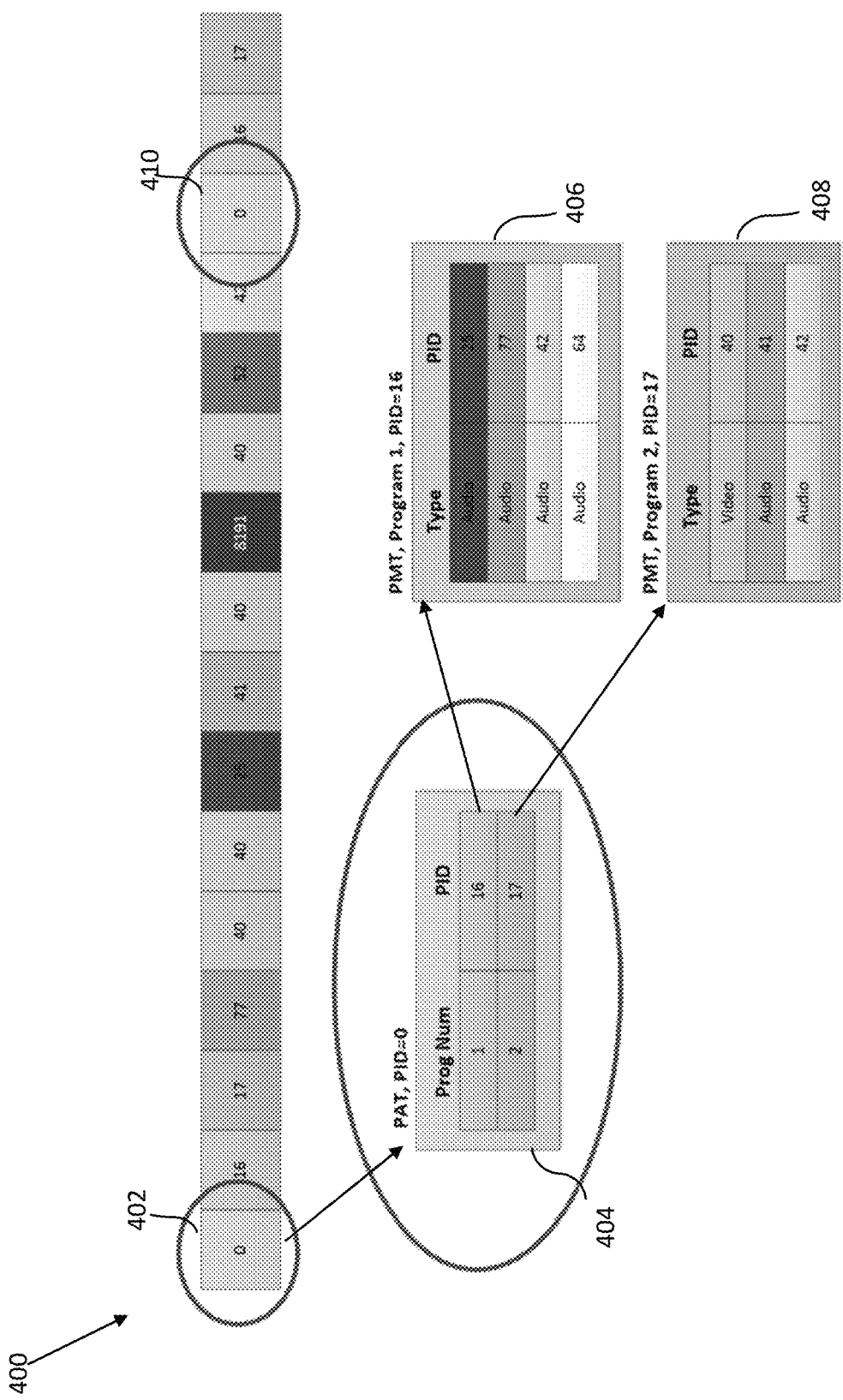
FIG. 6 shows an example where a PAT was found and parsed from an MPEG transport stream in accordance with the disclosed principles.
Figure 7:
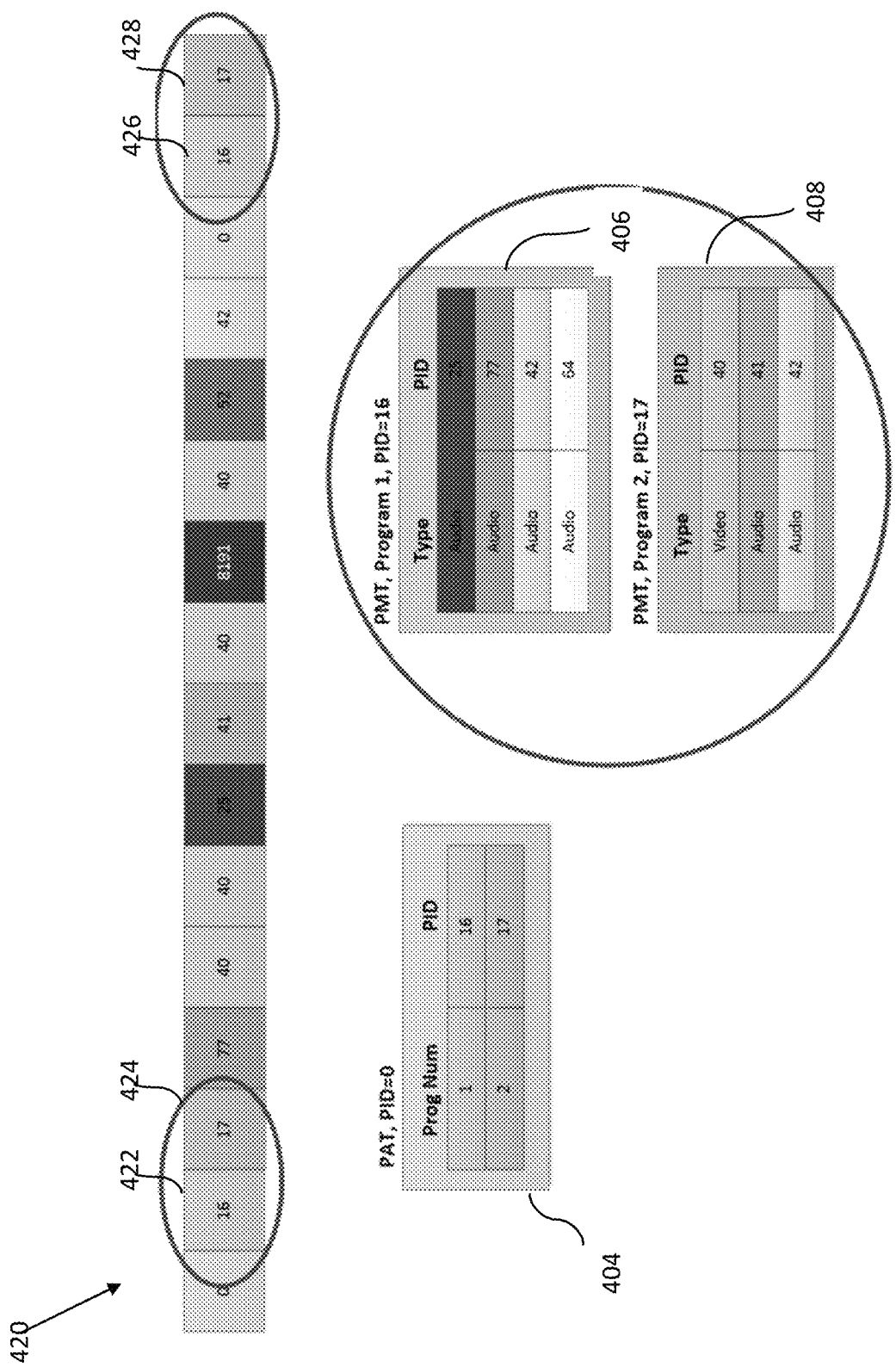
FIG. 7 shows an example where PMTs were found and parsed from an MPEG transport stream in accordance with the disclosed principles.
Figure 8:
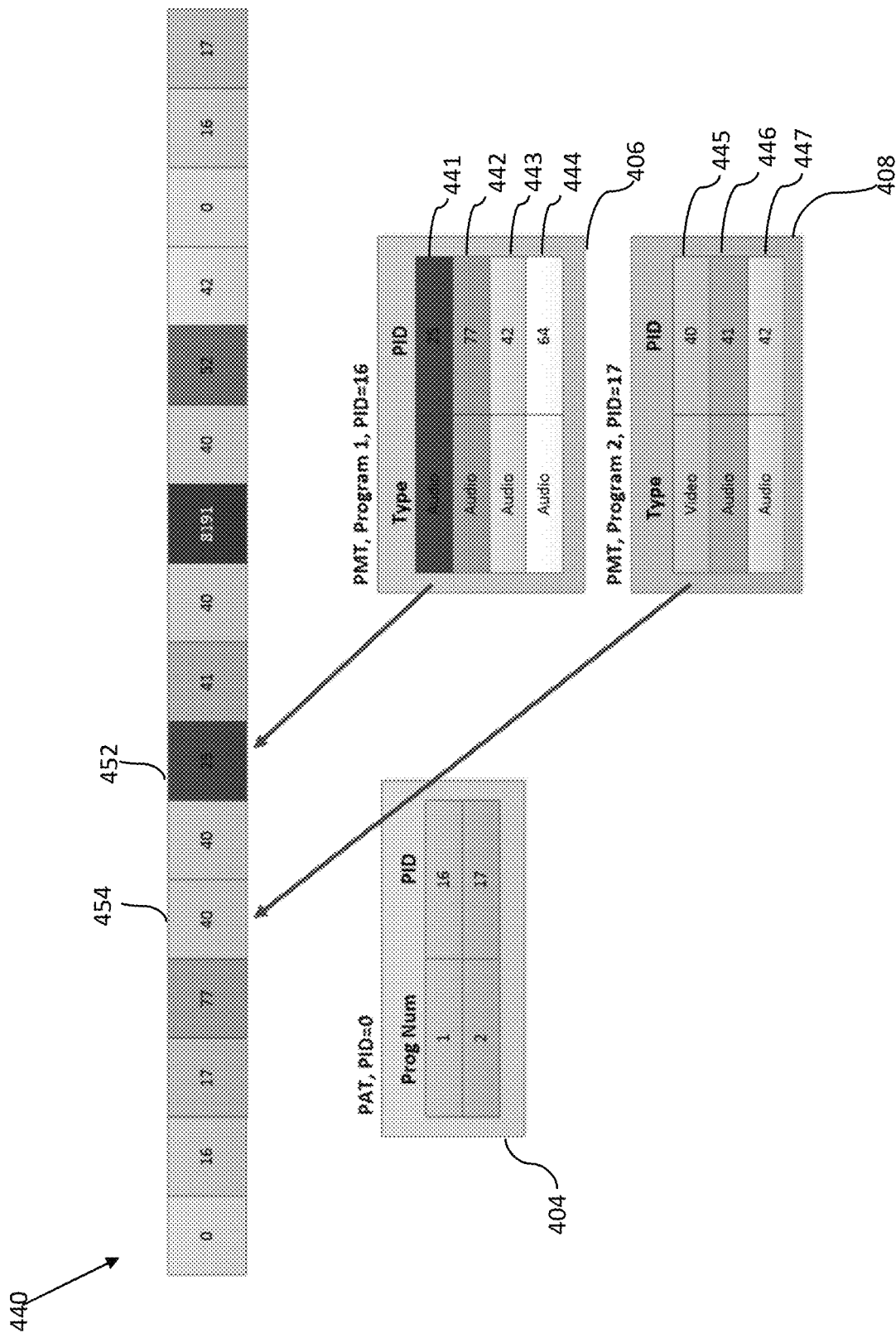
FIG. 8 shows an example where at least one packet was found for an element of programs found in the PMTs of FIG. 8.

The following are a few examples of the types of MPEG content validations that may be performed and output by the test instrument 100 and method 300. FIG. 6 shows an example 400 where a PAT 404 was found and parsed from an MPEG transport stream in packet 402 in accordance with the disclosed principles. As shown in the example 400, the packet 402 identified by PID 0 was parsed, revealing a PAT 404 mapping program 1 to PID 16 and program 2 to PID 17. As shown in the example, PID 16 identifies the packet containing the PMT 406 for program 1 and PID 17 identifies the packet containing the PMT 408 for program 2. FIG. 6 also shows a second packet 410 having a PID of 0, which presumably would contain the same PAT 404.

As shown in example 420 (FIG. 7), the transport stream data includes two packets 422, 426 having a PID of 16, which match the PID for program 1's PMT 406. Likewise, the QAM data includes two packets 424, 428 having a PID of 17, which match the PID for program 2's PMT 408. Each of these determinations can be output from the test instrument 100, if desired.

As shown in example 440 (FIG. 8), PMT 406 lists the elements/elementary streams that comprise program 1 by their associated PIDs. For example, PMT 406 lists four audio elements 441, 442, 443, 444 whose packets are identified by PIDs 25, 77, 42, 64. In the illustrated example, it can be seen that at least one packet 452 in the transport stream is identified by PID 25, which successfully matches an element in PMT 406. In addition, PMT 408 lists one video element 445 whose packet is identified by PID 40 and two audio elements 446, 447 whose packets are identified by PIDs 41, 42, respectively. In the illustrated example, it can be seen that at least one packet 454 in the transport stream is identified by PID 40, which successfully matches an element in PMT 408.

Figure 9:
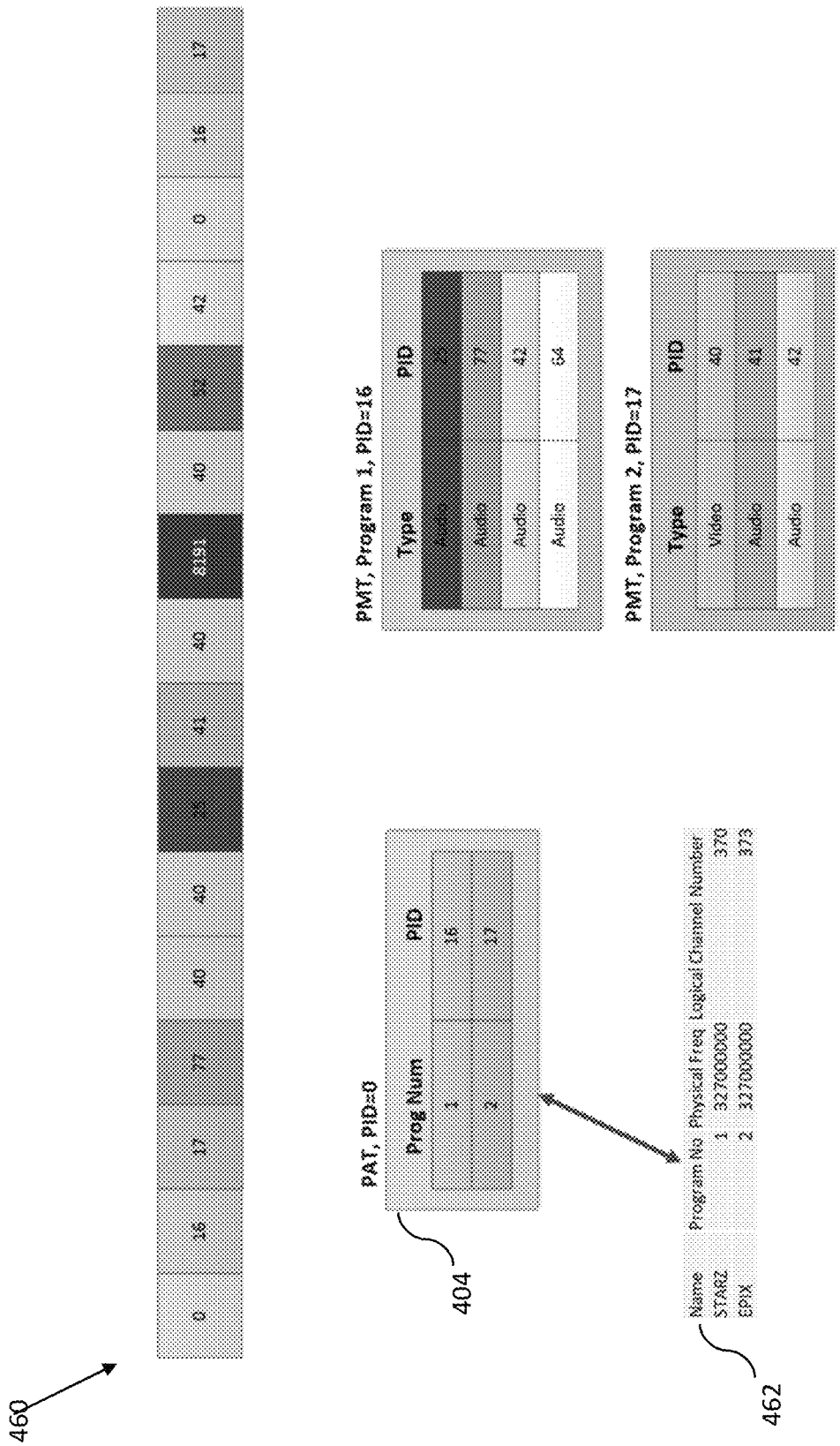
FIG. 9 shows an example where detected programs from an MPEG transport stream match a logical channel plan (LCP) in accordance with the disclosed principles.

FIG. 9 shows an example 460 where detected programs (e.g., programs 1 and 2) identified by PAT 404 (from the packet with PID 0) match a logical channel plan 462 in accordance with the disclosed principles. As can be seen in the illustrated example, the logical channel plan 462, similar to Table 1, contains a list of programs identified by name (STARZ, EPIX), program number (1, 2), physical channel frequency (327000000, 327000000) and logical channel number (370, 373). The detected match can be output from the test instrument 100, if desired.

Figure 10:
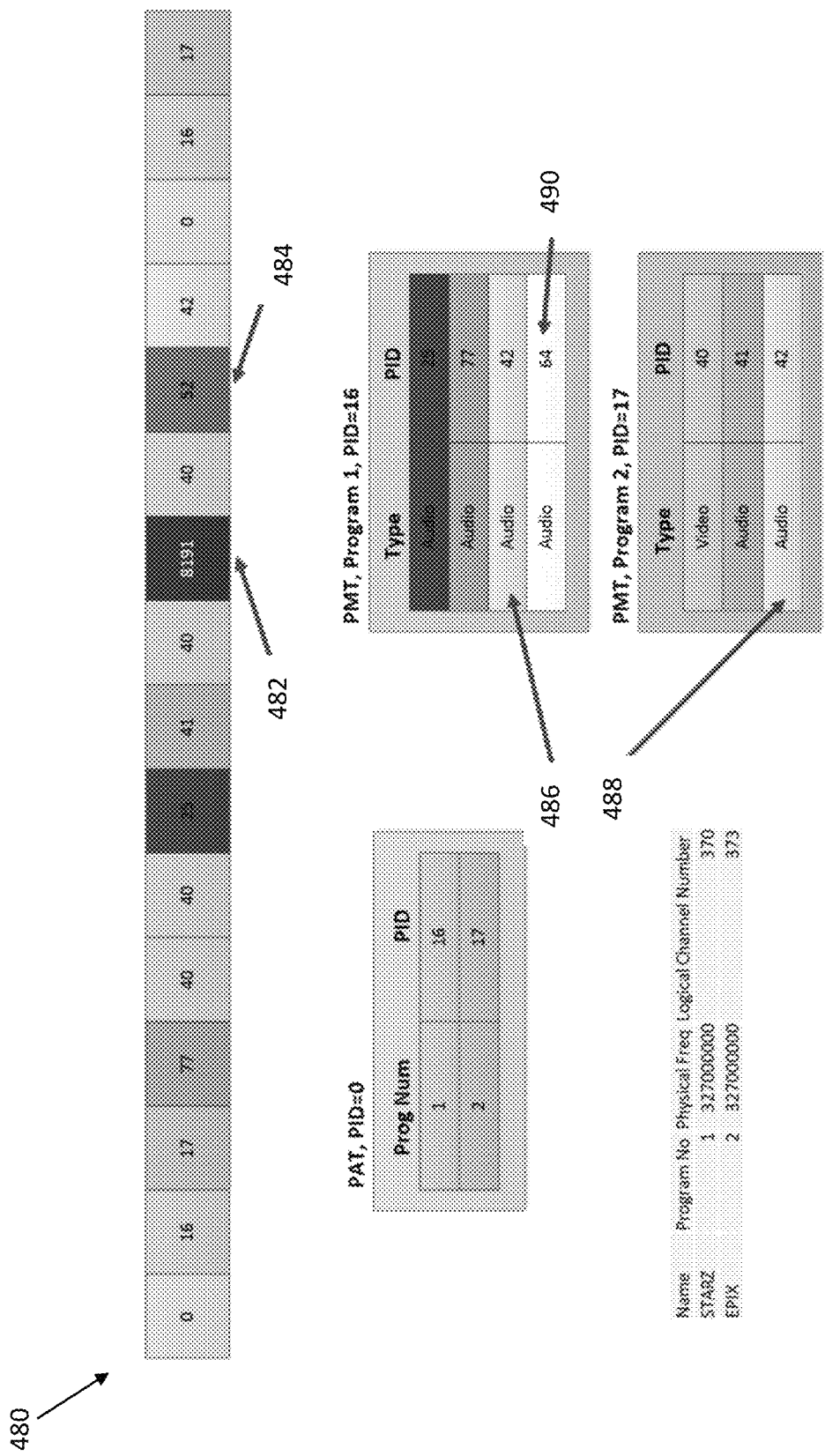
FIG. 10 shows an example illustrating additional features that may be validated and or observed in accordance with the disclosed principles.

FIG. 10 shows an example 480 illustrating additional features that may be validated and or observed in accordance with the disclosed principles. For example, and as discussed above with respect to method steps 308 and 310, the disclosed principles may validate DOCSIS channels by detecting PIDs 8190 and 8191. In the illustrated example 480, at least one packet 482 includes PID 8191. In addition, as shown by elements 484, 488, PIDs (e.g., PID 42) can be shared between programs. This is not an error. In addition, element 490 (PID 64) was not found in the transport stream data, but this not detected as an error because other elementary streams for program 1 were found by the test instrument 100 (e.g., as discussed above with respect to FIG. 8). Moreover, in the illustrated example 480, there is a packet 484 with a PID of 52 that is not found in either PMT. This is not an error in the illustrated example because the table having this PID is simply not shown in FIG. 10.

In addition, the illustrated example shows a total number of packets captured being 16, with one packet having a PID corresponding to the NULL packet. Thus, the disclosed method 300 and test instrument 100 can determine and output an overall channel utilization as 15/16, or 93.75%, if desired. Moreover, in the illustrated example, program 2 has 8 packets captured: two PMTs (PID 17), four video (PID 40) and two audio (PIDs 41, 42). Thus, the disclosed method 300 and test instrument 100 can determine and output that program 2 had a utilization of 8/16, or 50%, if desired. Likewise, program 2 had four video packets, meaning the disclosed method 300 and test instrument 100 can determine and output its video utilization as 4/16 or 25%, if desired.

Figure 11:
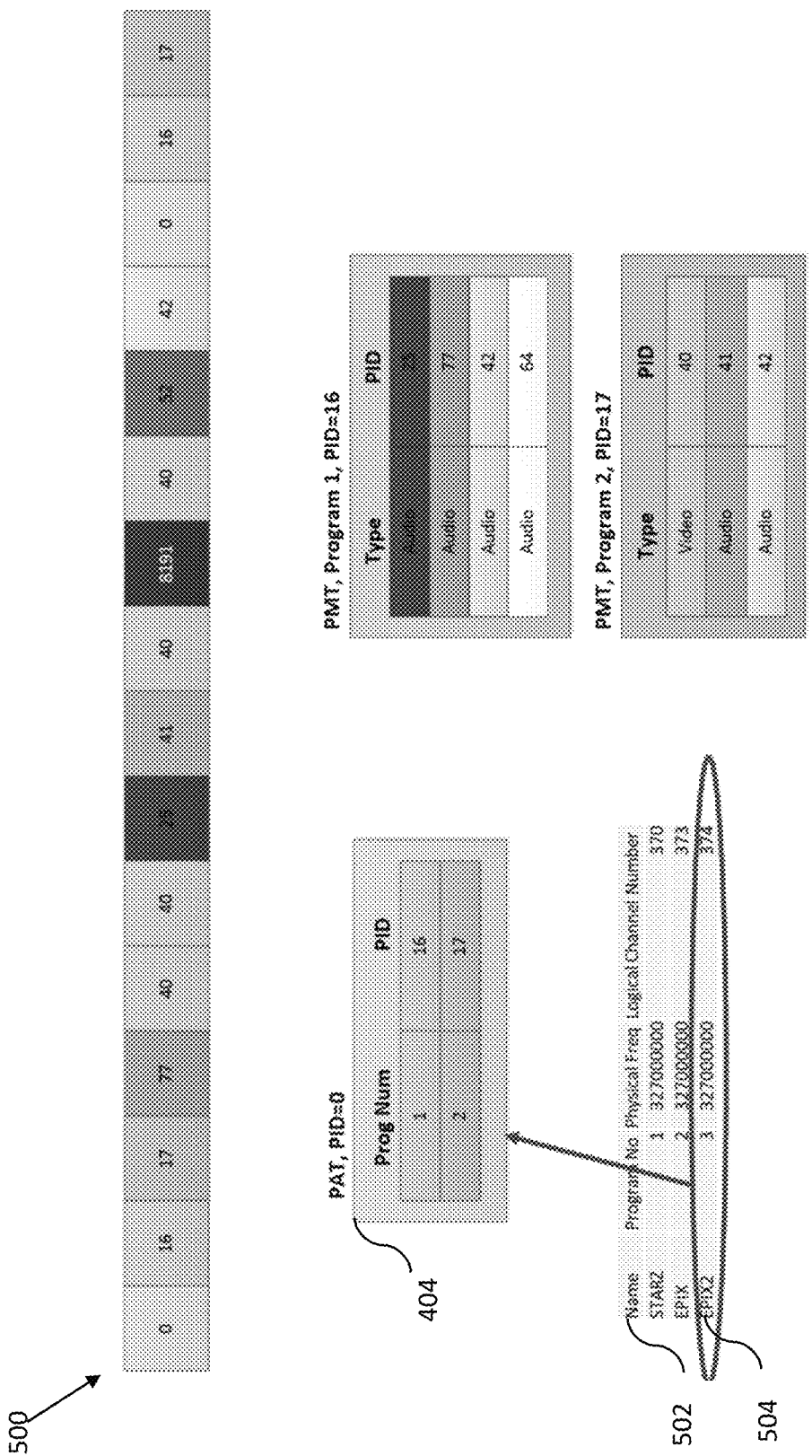
FIG. 11 shows an example of a detected error where a program in an LCP was not found in a PAT in accordance with the disclosed principles.

The following are a few examples of the types of MPEG content errors that may detected and output by the test instrument 100 and method 300. FIG. 11 shows an example 500 where a program 504 in an LCP 502 was not found in a PAT 404 within the MPEG transport stream. In accordance with the disclosed principles, the test instrument 100 would flag this as an error and provide an indication in one or more manners to alert the technician/user of a problem.

Figure 12:
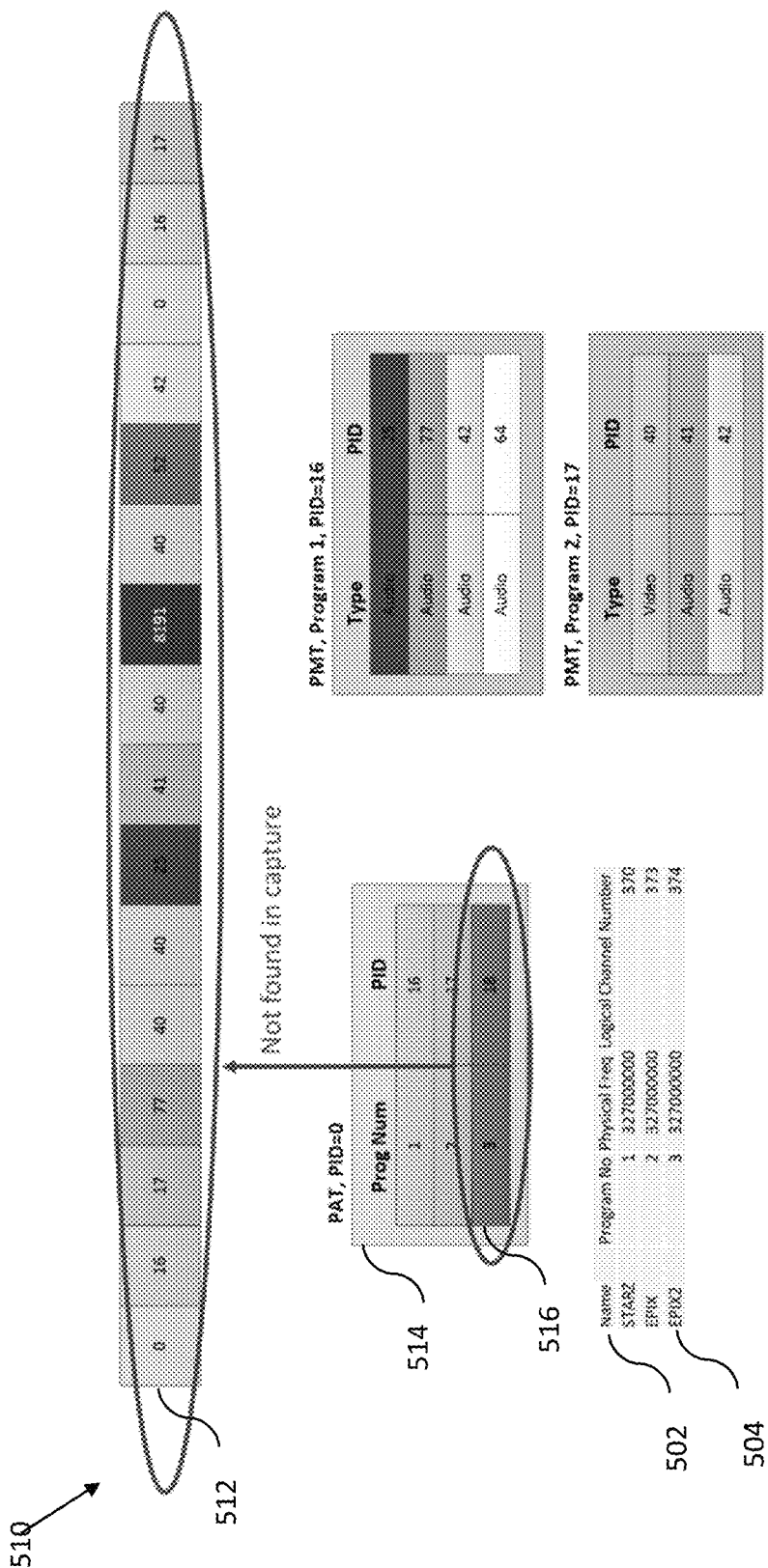
FIG. 12 shows an example of a detected error where a program in an LCP was found in a PAT, but had no corresponding PMT within an MPEG transport stream in accordance with the disclosed principles.

FIG. 12 shows an example 510 where a program 504 in an LCP 502 was found in a PAT 514 (as element 516), but had no corresponding PMT within the captured MPEG transport stream. In accordance with the disclosed principles, the test instrument 100 would flag this as an error and provide an indication in one or more manners to alert the technician/user of a problem.

Figure 13:
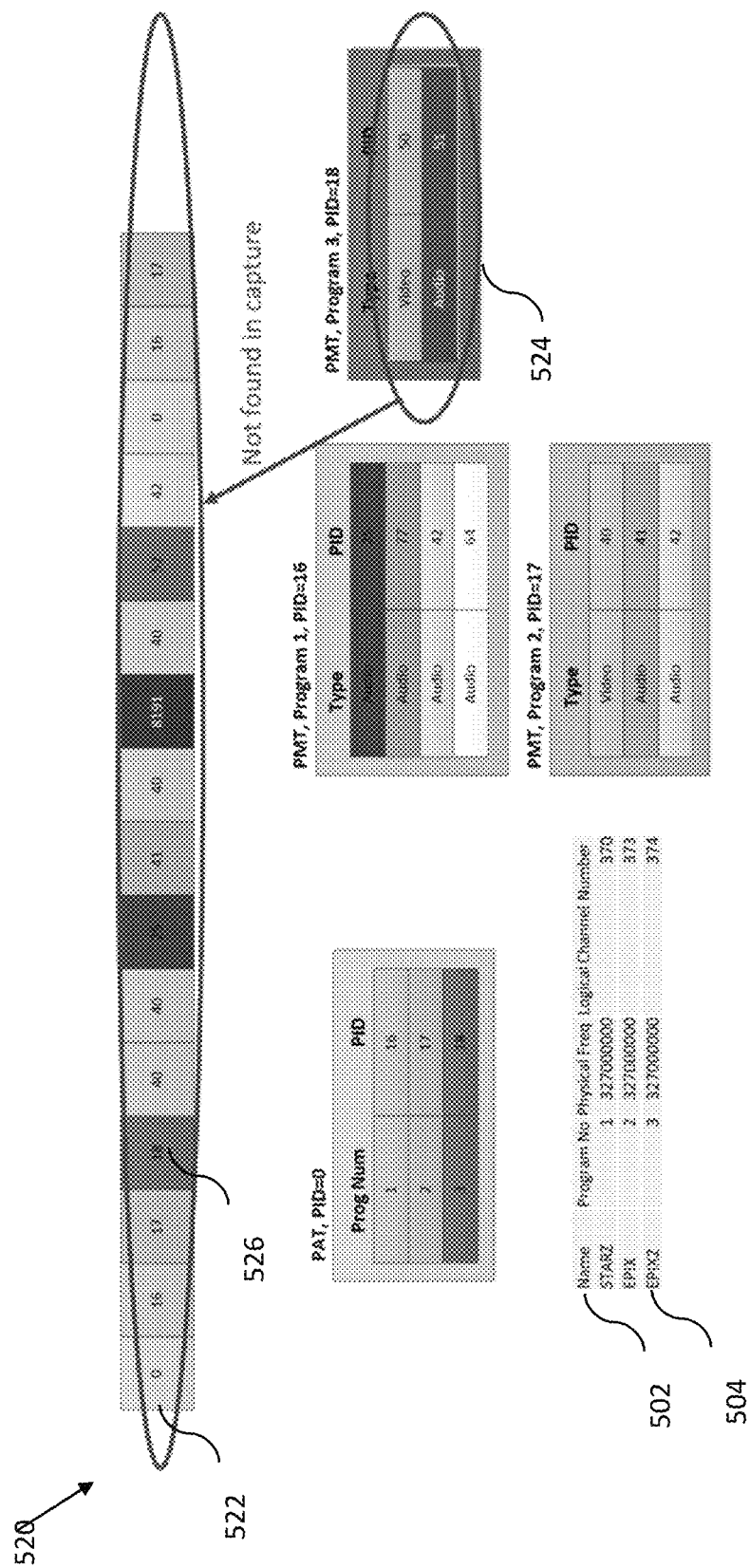
FIG. 13 shows an example of a detected error where a program in an LCP had no elementary stream packets within an MPEG transport stream in accordance with the disclosed principles.

FIG. 13 shows an example 520 where a program 504 in an LCP 502 had no elementary stream packets within any captured MPEG transport stream 522. In accordance with the disclosed principles, the test instrument 100 would flag this as an error because a packet 526 having a PID of 18 identifying the corresponding PMT 524 for program 3 was found, but neither of the two listed elementary stream packets (video with PID 50, audio with PID 51) were found in the captured data 522.

Figure 14:
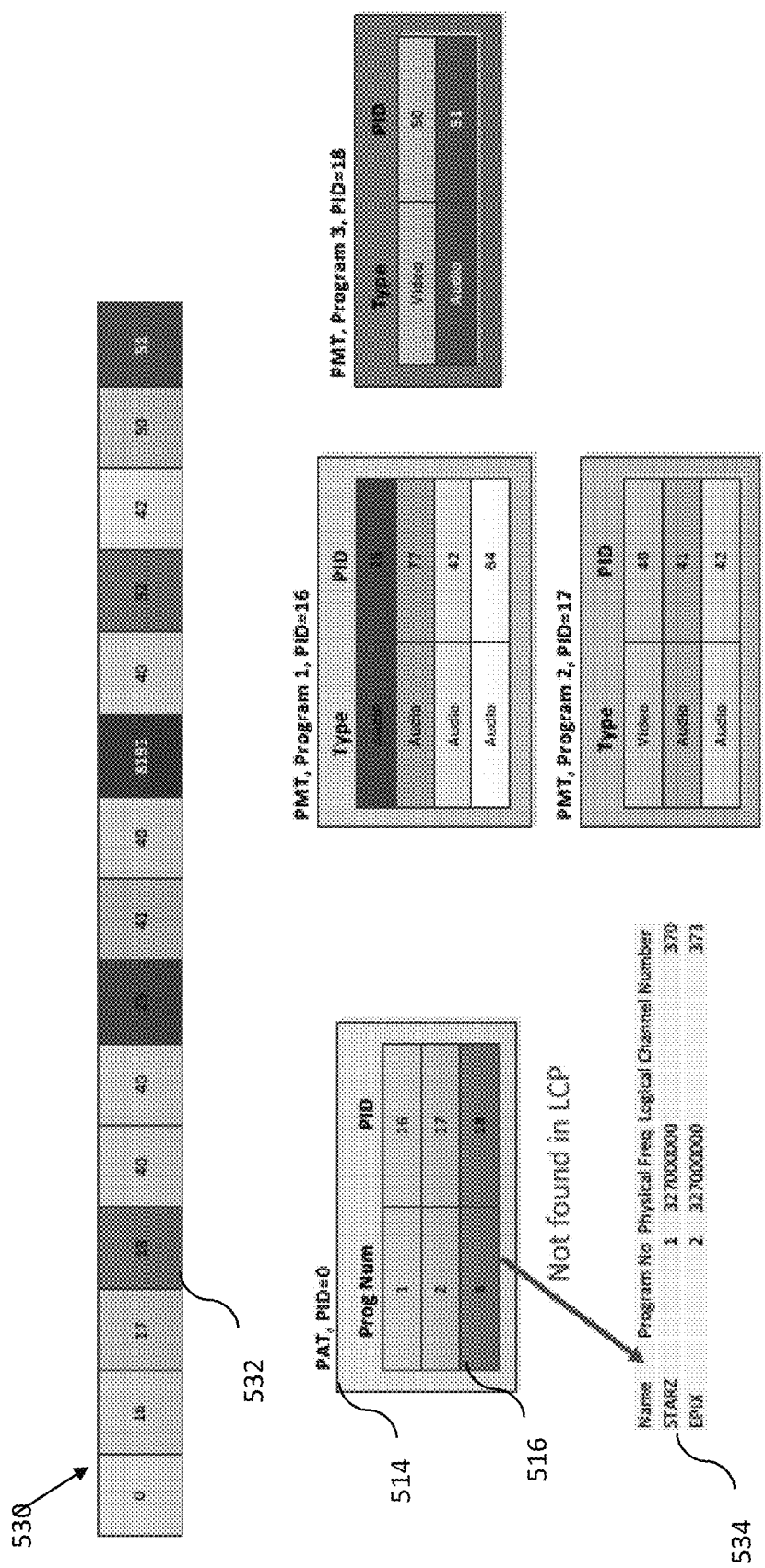
FIG. 14 shows an example of a detected error where an extra program within an MPEG transport stream was not found in the LCP in accordance with the disclosed principles.

FIG. 14 shows an example 530 where an extra program 516 identified within a PAT 514 was not found in the LCP 534. As can be seen in the illustrated example, at least one packet 532 having a PID of 18 (as identified in the PAT 514) is present in the captured data. In accordance with the disclosed principles, the test instrument 100 would flag this as an error and provide an indication in one or more manners to alert the technician/user of a problem.

Figure 15:
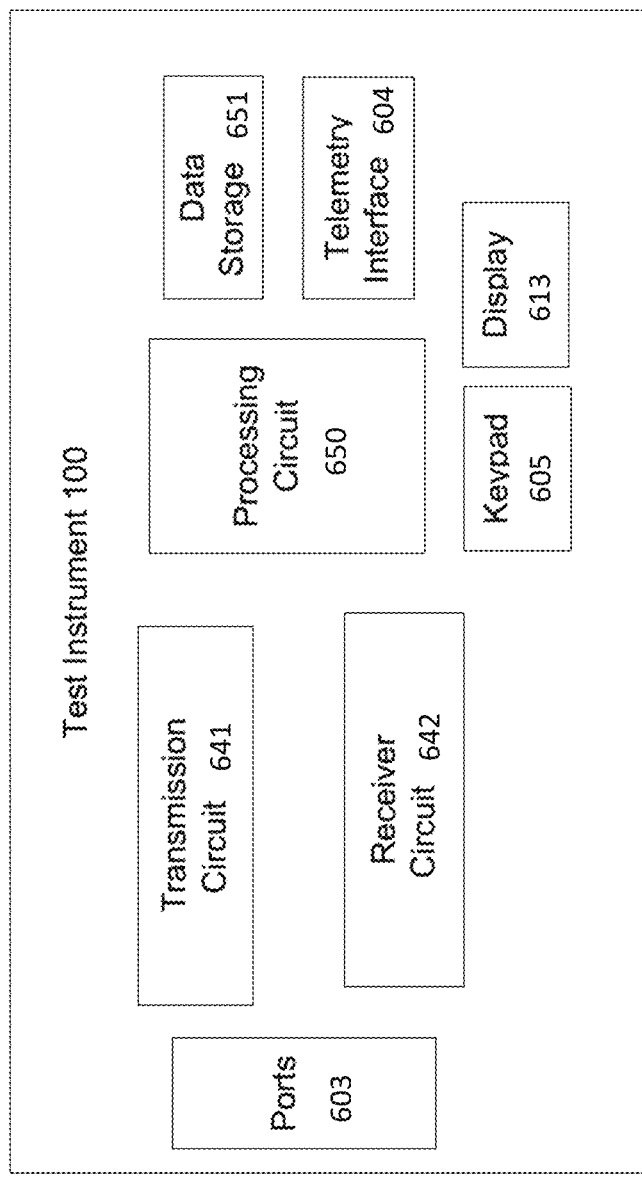
FIG. 15 shows a test instrument for validating MPEG content in accordance with the disclosed principles.

FIG. 15 shows a high-level block diagram of the test instrument 100, according to an example embodiment. It should be appreciated that the test instrument 100 may include components other than those shown. The test instrument 100 may include one or more ports 603 for connecting the test instrument 100 to a tap within the network 10 shown in FIG. 2. The one or more ports 603 may include connectors for connecting to cables in the network that carry traffic for upstream and downstream channels. The traffic may include the MPEG stream and packets discussed herein as well as other data. The test instrument 100 may include a telemetry interface 604 for connecting to a telemetry channel, such as a WiFi interface, Bluetooth interface, cellular interface or another network interface. The test instrument 100 may connect to a remote device via the telemetry interface 604.

The test instrument 100 may include a user interface, which may include a keypad 605 and display 613. The display 613 may include a touch screen display. A user may interact with the test instrument 100, such as to enter information, select operations, view measurements, view outcomes of the MPEG validations disclosed herein, via the user interface.

A data storage 651 may store any information used by the test instrument 100 and may include memory or another type of known data storage device. The data storage 651 may store measured signal data, MPEG and or other content or data used by the test instrument 100, particularly the data required for method 300. The data storage 651 may include a non-transitory computer readable medium storing machine-readable instructions executable by processing circuit 650 to perform operations of the test instrument 100 such as those described for method 300.

Transmission circuit 641 may include a circuit for sending test signals upstream to perform various tests, such as frequency sweep tests. The transmission circuit 641 may include encoders, modulators, and other known component for transmitting signals within the network. Receiver circuit 642 may include components for receiving signals from the network. The components may include components such as a demodulator, decoder, analog-to-digital converters, and other known components suitable for a receiver circuit.

Processing circuit 650 may include any suitable hardware to perform the operations of the test instrument 100 described herein, including the operations described with respect to FIGS. 5-14 and method 300 described herein. The hardware of the test instrument 100, including the processing circuit 650, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processing circuit 650 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

The method and instrument for implementing the MPEG content validation method disclosed herein provides numerous advantages over the current state of the art. For example, multiple data collections and the processing of that data are performed in parallel. An analysis of MPEG content can be performed in a few minutes (e.g., approximately 3 minutes), which is almost ten times faster than conventional testing methods. Moreover, all the processing can be performed by the test instrument 100, without the need to run a tap from the RPD 16 to a truck. Likewise, the expensive rack of legacy set-top boxes and a display required to perform the conventional testing are not required to perform the method 300 disclosed herein. As such, the disclosed method and test instrument perform faster testing and uses less equipment than conventional testing. As can be appreciated, this reduces technician man hours and the costs associated with the testing.

Moreover, the disclosed principles can validate DOCSIS channels via a test instrument, something that is not performed today. As such, method 300 and test instrument 100 disclosed herein provides a technical solution to a technical problem, particularly in the CATV network and analysis fields.

In addition, no additional hardware is needed to carry out the method 300 disclosed herein—i.e., no additional hardware is required to modify the test instrument's hardware or the network's Remote Phy architecture. In one or more embodiments, the method 300 may be ported to pre-existing test instruments as part of a software upgrade. No board spin or additional product cost would be required to implement the disclosed principles. This means that the disclosed principles may be deployed on tens of thousands of test instruments that are already deployed in the field.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for testing Moving Picture Experts Group (MPEG) content transmitted to a downstream portion of a cable television network, said method comprising:
   obtaining a logical channel plan comprising logical channels;
   obtaining MPEG data on each physical channel within the MPEG content and performing an analysis and accounting of the MPEG data to identify programs, elementary streams and associated packet identifiers (PIDs) of said programs, and a count of a number of times PIDs were repeated within an analysis duration;
   validating the logical channel plan against the analyzed MPEG data; and
   determining if each logical channel is present and properly formed.

2. The method of claim 1, wherein determining if each logical channel is present and properly formed comprises:
   determining whether first content within an MPEG transport stream matches content within the logical channel plan;
   determining whether second content within the MPEG transport stream is associated with third content within the MPEG transport stream; and
   validating the MPEG content when it is determined that the first content matches the content within the logical channel plan and when it is determined that the second content is associated with the third content.

3. The method of claim 2, wherein the first content comprises a program number and determining that the first content matches the content within the logical channel plan comprises:
   determining that the program number is contained within the logical channel plan.

4. The method of claim 2, wherein the second content comprises a packet identifier associated with a program number found within a program association table (PAT) and determining that the second content is associated with the third content comprises:
   determining that the MPEG transport stream comprises a packet with the packet identifier associated with the program number.

5. The method of claim 4, wherein the packet having the packet identifier associated with the program number comprises a program mapping table (PMT) that maps one or more program elements to corresponding packet identifiers of other packets that may be contained within the MPEG transport stream.

6. The method of claim 5, wherein validating the MPEG content further comprises determining that the MPEG transport stream comprises at least one packet corresponding to the one or more program elements.

7. The method of claim 2, further comprising:
   detecting packet identifiers of the analyzed MPEG data;
   determining whether the packet identifiers are only associated with Data Over Cable Service Interface Specification (DOCSIS) data; and
   validating the MPEG data as being from a DOC SIS channel when it is determined that the packet identifiers are only associated with DOC SIS data.

8. The method of claim 2, further comprising:
   determining that there is an error in the MPEG content when it is determined that the first content does not match the content within the logical channel plan or when it is determined that the second content is not associated with the third content.

9. The method of claim 8, wherein the first content comprises a program number and determining that the first content does not match the content within the logical channel plan comprises:
   determining that the program number is not contained within the logical channel plan.

10. The method of claim 1, further comprising:
   determining whether a test instrument can lock on to the analyzed MPEG data; and
   determining that there is an error when the test instrument cannot lock on to the analyzed MPEG data.

11. A computing device for testing Moving Picture Experts Group (MPEG) content transmitted to a downstream portion of a cable television network, said computing device comprising:
   a storage device; and
   a processor executing program instructions stored in the storage device and being configured to:
      obtain contiguous MPEG data from an MPEG transport stream;
      obtain a logical channel plan;
      determine whether first content within the MPEG transport stream matches content within the logical channel plan;
      determine whether second content within the MPEG transport stream is associated with third content within the MPEG transport stream; and
      validate the MPEG content when it is determined that the first content matches the content within the logical channel plan and when it is determined that the second content is associated with the third content.

12. The computing device of claim 11, wherein the first content comprises a program number and the processor determines that the first content matches the content within the logical channel plan by:
   determining that the program number is contained within the logical channel plan.

13. The computing device of claim 11, wherein the second content comprises a packet identifier associated with a program number found within a program association table (PAT) and the processor determines that the second content is associated with the third content by:
   determining that the MPEG transport stream comprises a packet with the packet identifier associated with the program number.

14. The computing device of claim 13, wherein the packet having the packet identifier associated with the program number comprises a program mapping table (PMT) that maps one or more program elements to corresponding packet identifiers of other packets that may be contained within the MPEG transport stream.

15. The computing device of claim 14, wherein validating the MPEG content further comprises determining that the MPEG transport stream comprises at least one packet corresponding to the one or more program elements.

16. The computing device of claim 11, wherein the processor is further configured to:
   detect packet identifiers of the MPEG data;
   determine whether the packet identifiers are only associated with Data Over Cable Service Interface Specification (DOCSIS) data; and
   validate the MPEG data as being from a DOCSIS channel when it is determined that the packet identifiers are only associated with DOC SIS data.

17. The computing device of claim 11, wherein the processor is further configured to:
   determine that there is an error in the MPEG content when it is determined that the first content does not match the content within the logical channel plan or when it is determined that the second content is not associated with the third content.

18. The computing device of claim 17, wherein the first content comprises a program number and the processor determines that the first content does not match the content within the logical channel plan by:
   determining that the program number is not contained within the logical channel plan.

19. The computing device of claim 17, wherein the second content comprises a packet identifier associated with a program number found within a program association table (PAT) and the processor determines that the second content is not associated with the third content by:
   determining that the MPEG transport stream does not comprise a packet with the packet identifier associated with the program number.

20. The computing device of claim 11, wherein the processor is further configured to:
   determine whether the computing device can lock on to the MPEG data; and
   determine that there is an error when the computing device cannot lock on to the MPEG data.

* * * * *